United States Patent [19]

Walsh

[11] 3,816,177

[45] June 11, 1974

[54] SECONDARY CELLS AND BATTERIES

[75] Inventor: Myles A. Walsh, West Falmouth, Mass.

[73] Assignee: Eco-Control, Inc., Cambridge, Mass.

[22] Filed: Nov. 17, 1972

[21] Appl. No.: 307,650

[52] U.S. Cl. .................. 136/24, 136/30, 136/137
[51] Int. Cl. ............................................ H01m 43/00
[58] Field of Search...... 136/24, 30.31, 20.22, 83 R, 136/6 R, 6 L, 6 F, 102, 103, 100 R, 137, 154–155

[56] References Cited
UNITED STATES PATENTS

| | | | |
|---|---|---|---|
| 2,566,114 | 8/1951 | Bloch............................ | 136/155 X |
| 3,057,760 | 10/1962 | Dereska et al..................... | 136/137 |
| 3,285,781 | 11/1966 | Zito, Jr............................. | 136/30 X |
| 3,352,720 | 11/1967 | Wilson et al....................... | 136/137 |
| 3,373,058 | 3/1968 | Bloch.............................. | 136/155 X |
| 3,408,232 | 10/1968 | Blue et al.......................... | 136/30 |
| 3,576,503 | 5/1971 | Bloch et al........................ | 136/83 R X |

Primary Examiner—Anthony Skapars
Attorney, Agent, or Firm—Kenway, Jenney & Hildreth

[57] ABSTRACT

Secondary cells include a zinc or cadmium electrode, a counter electrode formed of an inert material for holding electrochemically active halogens such as bromine, chlorine and iodine, an aqueous zinc halide or cadmium halide electrolyte, a quarternary ammonium halide and a depolarizer in the electrolyte. The depolarizer is an organic complexing solvent which dissolves in water, is non-reactive towards the halogen or halogens in the cell and forms a water insoluble complex in the presence of quarternary ammonium polyhalides. The quarternary ammonium halides are chosed so that at the counter electrode they combine with halogens to form polyhalides.

A series-type battery has a plurality of these cells.

24 Claims, 7 Drawing Figures

PATENTED JUN 11 1974 3,816,177

SECONDARY CELLS AND BATTERIES

BACKGROUND OF THE INVENTION

The field of the present invention, in general, is cells and batteries. In particular, the invention pertains to improved cells and batteries employing zinc or cadmium and one or more halogens as the electrochemically active elements.

Although cells which include an aqueous solution of a zinc halide or a cadmium halide as the electrolyte such as zinc-bromine cells are known, with the known prior art zinc-bromine cells, it is difficult to keep metallic zinc and liquid bromine apart while simultaneously achieving a structure by which a good percentage of the theoretical energy storage capacity can be realized. In connection with the foregoing, the reason why it is difficult to keep the liquid bromine apart from the zinc is that liquid bromine is soluble in the aqueous zinc bromide electrolyte. Thus, liquid bromine, as it is formed in the cell, dissolves in the electrolyte. Of course, with bromine dissolved in the electrolyte, it is difficult to prevent the dissolved bromine from migrating towards the zinc electrode. The problem of halogen migration is also significant in the case of zinc or cadmium cells with aqueous chlorides as the electrolytes.

One prior art technique for keeping the metallic zinc and liquid bromine in zinc-bromine cells apart relies on the use of quarternary ammonium halides dissolved in the electrolyte. In such cells, on charging, elemental bromine is formed by the decomposition of the bromide, and elemental bromine combines with the quarternary ammonium halide which is dissolved in the electrolyte to form solid, water insoluble polybromides. The use of quarternary ammonium halides, however, has not proved fully satisfactory, primarily because of the instability of the solid polybromide and the fact that solid polybromides distant from the inert electrode are not readily available for electrochemical reaction. Of course, such removal of bromine from the electrochemical system decreases the life of the cell.

SUMMARY OF THE INVENTION

The difficulties associated with zinc-bromine storage cells and batteries are significantly reduced by the zinc or cadmium-halogen secondary cell and battery of the present invention which includes an organic complexing solvent depolarizer dissolved in the electrolyte which is non-reactive towards the halogen or halogens in the cell system and forms a stable, water insoluble complex in the presence of solid quarternary ammonium polyhalides. With such a depolarizer present in the cell, not only is the problem of halogen migration reduced, but also the complex which results from the combination of the polyhalide and the depolarizer is stable. Furthermore, with such a depolarizer, the amount of halogen that is removed from the electrochemical system is reduced.

Accordingly, it is an object of the present invention to provide a zinc or cadmium halide cell in which the problem of halogen migration is reduced.

It is another object of the invention to provide a zinc or cadmium halide cell and battery of the type which includes a quarternary ammonium halide in the electrolyte; but, in which the amount of halogen that remains available in the cell, as polyhalides are formed, is increased when compared with the prior art cells employing such quarternary ammonium halides.

A further object of the present invention is to provide a zinc or cadmium halide cell of the type which includes a quarternary ammonium halide in the electrolyte in which polyhalides after being formed become a part of a stable water insoluble complex.

A further object of the present invention is to provide a zinc or cadmium halide cell of the type which includes a quarternary ammonium halide in the electrolyte which also includes a depolarizer that is an organic complexing solvent which dissolves in water, is non-reactive towards the halogen or halogens in the cell and forms a water insoluble complex in the presence of quarternary ammonium halides.

DESCRIPTION OF THE PREFERRED EMBODIMENTS

At the outset, it is desirable to comment on certain terms that are used throughout this specification and claims. For example, the terms "zinc electrode" and "bromine electrode" are not intended to imply that the electrode elements are formed of these materials exclusively. As is conventional practice, the terms are used merely to indicate the electrochemically active element reacting.

The zinc or cadmium-halogen electrodes are preferably porous, electrically conductive, and non-corrosive. Carbon in its various forms is a preferred material. The carbon of the zinc or cadmium electrode serves as a plating surface for zinc or cadmium. It may be desirable to utilize either porous carbon or graphite to form zinc or cadmium electrodes.

Furthermore, although reference is made to one counter and one zinc electrode, it is obvious that cells in accordance with the present invention may include more than one pair of electrodes. Moreover, the invention includes batteries of two or more cells constructed in accordance with the present invention. In addition, since cadmium is chemically similar to zinc, it is obvious that the zinc in the electrode and the electrolyte of any example which follows can be replaced by cadmium. In the case of the halogen electrodes, it is necessary that substantial amounts of one or more halogens selected from the group of bromine, chlorine and iodine be stored in the pores of the electrode. As is explained in detail below, such storage is accomplished by storing quarternary ammonium polyhalides in the pores of the halogen electrode. It is accordingly, preferred that the halogen electrode be formed of porous carbon or graphite felt. A suitable graphite felt for forming the halogen electrodes in accordance with the present invention UCAR grade WDF graphite felt sold by Union Carbide Corporation, Carbon Products Division, 270 Park Ave., New York, N.Y. 10017. UCAR grade WDF graphite felt has a minimum carbon assay of 99.6 percent.

In all cases, the carbon forming the electrode should possess sufficient structural integrity to permit handling and mounting as a unitary element. Thus, the electrodes may include reinforcing elements such as cloth and fibers, which are substantially chemically inert. Fiberglass and asbestos constitute preferred reinforcing materials, although certain plastics, particularly fluorocarbon polymers, may also be employed.

A distinct feature of the present invention is that the electrolyte contains a depolarizer. The term "depolarizer" is narrowly defined as any water soluble compound which is capable of combining with either bromine, chlorine or iodine containing polyhalides to form water insoluble complexes rich in these halogens. As will be more fully understood by reference to the following detailed description, the addition of a depolarizer defined in this manner results in improved cell performance, improved energy-storage capacity, and longer cell life.

The depolarizer is an organic solvent, but not necessarily a liquid, and may be any of the organic solvents which are water soluble, non-reactive to either bromine, chlorine or iodine and which are good solvents for quarternary ammonium polyhalides. Stated another way, the cells of the present invention include a depolarizer which can be placed in the electrolyte and which combines with the polyhalides that are formed in the cell to form insoluble complexes. By way of illustration, examples of suitable organic complexing solvents are:

It might be noted that those solvents listed above, which when dissolved in the electrolyte enhance performance, are cyclic and non-cyclic hydrocarbons with one or more heteroatoms and are partially water soluble due to the aprotic dipole in the molecule.

Those complexing solvents which are usable in the cells of the present invention for complexing with polyhalides were determined by preparing a 10 percent by weight solution of the complexing solvent in water. A few grams of a polyhalide was the added to a test tube containing the water-complexing solvent solution. Visible evidence of the formation of an insoluble oil-like complex indicated that the solvent is usable as a complexing solvent in accordance with the present invention.

Although the exact chemistry of the complex formation is not certain, some chemical bonding is believed to exist between the polyhalide, the complexing solvent and the water. However, as stated above, the nature of the bond between the constituents which form the complex is not understood and could be ionic, covalent or merely the result of van der Waals forces between the three constituents.

In one test to determine the nature of the bond in the complex, a few grams of tetramethyl ammonium bromide was added to a ten percent propylene carbonate in water solution. As a result, a red oil-like complex was formed. Appropriate measurements of the complex indicated that a definite stoichiometric relationship between the polyhalide, the complexing solvent and the water exists. In this case, the resulting complex had the following molecular relationship;

| | |
|---|---|
| tetramethyl ammonium bromide | 2 parts |
| propylene carbonate | 2 parts |
| water | 1 part |

That a definite molecular relationship exists is predicated on the result of measurements by nuclear magnetic resonance. As a result of these measurements, some shifting of bonding was recorded which implies a definite complex formation between the three constituents.

At this point it should be noted that many organic solvents, such as amines, react with halogens, particularly bromine. For example, acetone cannot be used as a solvent in the bromine cells of the present invention because acetone reacts with bromine.

Any water-soluble quarternary ammonium halide where the halide ions are chloride, bromide or iodide ions is effective for practicing the present invention.

The substituents on the nitrogen of the quarternary ammonium halide are hydrogen, alkyl or aryl groups or any combination of these functionalities. The alkyl or aryl groups may be further functionalized with groups which enhance water solubility such as acids, alcohols, amines, carbonates, esters, ketones, sulfones, sulfoxides, sulfates, phosphates, ammonium groups, amides, thioesters, carbamates, acetals, ketals, or any combination of these functionalities. The nitrogen of the quarternary ammonium halide may be part of one or more cyclic structures. The quarternary ammonium halide may also be a water soluble polymer.

By way of example, suitable quarternary ammonium halides include phenyltrimethyl ammonium bromide, N,N-dimethyl morpholinum bromide, tetramethyl ammonium chloride, tetramethyl ammonium bromide and N,N,N,N,N,N-hexamethyl diammonium methylene dibromide.

The electrolyte is generally saturated with more than one of the quarternary ammonium halides for most efficient energy storage.

Polyhalide ions which are formed in the cells of the present invention can be represented by a generalized formula $$X_m Y_n Z_p \pm$$

where X, Y and Z represent either an identical, two different or, in the case of the anions, three different halogen atoms. The sum $m + n + p$ is usually an odd number than can be 3, 5, 7, or 9.

Table 1 below lists polyhalide ions of electrovalent salts. The list does not include ions of compounds whose identification remains doubtful or polyhalide ions identified only in solutions through some sort of physicochemical measurement.

TABLE 1

| $X_3^-$ | $X_5^-$ | $X_7^-$ | $X_9^-$ | $X_n^-$ | $X_n^+$ |
|---|---|---|---|---|---|
| $I_3^-$ | $I_5^-$ | $I_7^-$ | $I_9^-$ | $I_4^-$ | $ICl_2^+$ |
| $I_2Br^-$ | $I_4Cl^-$ | $I_6Br^-$ | | | $BrF_2^+$ |
| $I_2Cl^-$ | $I_4Br^-$ | $IF_6^-$ | | | $IF_4^+$ |
| $IBr_2^-$ | $I_2Br_3^-$ | $Br_6Cl^-$ | | | |
| $ICl_2^-$ | | $I_2Br_2Cl^-$ | | | |
| $IBrCl^-$ | $I_2BrCl_2^-$ | | | | |
| $IBrF^-$ | $I_2Br_3^-$ | | | | |
| $Br_3^-$ | $IBrCl_3^-$ | | | | |
| $Br_2Cl^-$ | $ICl_4^-$ | | | | |
| $BrCl_2^-$ | $ICl_3F^-$ | | | | |
| $Cl_3^-$ | $IF_4^-$ | | | | |
| | $BrF_4^-$ | | | | |
| | $ClF_4^-$ | | | | |

Polyhalide anionic salts are formed mostly easily with large monovalent cations.

For a discussion of the chemistry of various polyhalogen complex ions, see the article Popov, "Polyhalogen Complex Ions," which appears in Gutmann, *Halogen Chemistry*, Vol. 1, Academic Press, 1967, pages 225–264, the teachings of which are incorporated herein by reference. Another article which discusses the chemistry of the perhalides of quaternary ammonium salts is Chattaway and Hoyle, "Perhalides of Quaternary Ammonium Salts," *Journal of Chemical Science*, Vol. 123, 1923, pages 654–662, the teachings of which are also incorporated herein by reference.

In connection with Table 1, it should be noted that the list of polyhalide ions contained therein is a comprehensive list of polyhalide ions that have been reported in the literature. The inclusion of Table 1 in the specification is not intended to imply that each and every polyhalide ion listed therein is formed in the various embodiments of the present invention. For example, it is not desirable to include fluorides in the electrolyte since fluorine gas and/or hydrogen fluoride is difficult to handle. Furthermore, as stated above, the use of quarternary ammonium halides in zinc or cadmium halogen cells is known in this art. A U.S. patent which is directed to such cells is U.S. Pat. No. 3,373,058 entitled "Primary Cell Comprising an Aqueous Solution Containing Halogen and a Metal Halide," M. R. Bloch, the teachings of which are incorporated herein by reference. An earlier patent to Bloch is U.S. Pat. No. 2,566,114 entitled "Electric Cell," R. Bloch, the teachings of which are also incorporated herein by reference. The significance of the foregoing is that the present invention is an improvement on the "Bloch" cell in that the cell of the present invention includes a depolarizer. In this regard, the alkyl-ammonium halides such as the tetramethyl and tetraethyl ammonium halides disclosed in U.S. Pat. No. 2,566,114 are usable in the cell of the present invention. Indeed, exhaustive tests in accordance with the present invention have indicated that any prior art cell of the type disclosed in the Bloch patents which includes a quarternary ammonium halide is improved by the addition of a depolarizer in accordance with the present invention which liquefies and isolates the halogen rich polyhalides.

In addition to the depolarizer and one or more quarternary ammonium halides, the electrolyte of the cell of the present invention includes water and a zinc or cadmium halide. Other salts, such as zinc sulfate, may be added to the electrolyte to improve electrolyte conductivity and/or zinc plating characteristics. For most efficient performance, it is generally preferred that the organic solvent constitute from 1 percent to 5 percent of the total electrolyte volume.

A zinc halide or cadmium halide is added in an amount from 0.4 moles/liter to saturation. For most efficient energy storage, it is generally preferred that the molarity range from 3 to 6.

On the charging cycle, zinc is deposited on the zinc electrode and elemental bromine, chlorine or iodine is liberated at the counter electrode. The elemental halogen immediately combines with the dissolved quarternary ammonium halide and dissolved organic complexing solvent (depolarizer) to form a complex which is substantially insoluble in the electrolyte, and which has a surface tension less than that of the electrolyte. It is preferred that the complex wet the surfaces of the counter electrode. Thus, it is desirable that the counter electrode be formed of a material which is poorly wet by the electrolyte, such as carbon in its various forms or graphite.

On the discharge cycle, the halides are reformed with the generation of power. The cell is completely discharged when either the zinc or the complex is entirely consumed.

In accordance with the present invention, where X is either a bromide, chloride or iodide ion, the depolarizer (complexing solvent) reacts at the halide electrode according to the net reactions:

$$2 X^- + \text{quarternary ammonium halide} + \text{depolarizer} \rightleftarrows \text{complex} + 2 e^- \qquad (1)$$

or $$2 X^- \rightleftarrows X_2 + 2 e^- \qquad (1b)$$

$$X_2 + \text{quarternary ammonium halide} \rightleftarrows \text{polyhalide} \qquad (1c)$$

$$\text{polyhalide} + \text{depolarizer} \rightleftarrows \text{complex} \qquad (1d)$$

In Equation 1, the arrow to the right indicates the direction of the chemical reaction during charge of the cell, and the arrow to the left indicates the chemical reaction occurring during discharge.

In accordance with this invention, on the charge cycle, metallic zinc or cadmium is deposited on the zinc or cadmium electrode and water insoluble complexes coat the surfaces of the halogen electrode. Both of these coatings can be observed with the naked eye. Charging continues until about 80 percent of the zinc or cadmium halide is decomposed and about 80 percent of the quarternary ammonium halides are reacted according to Equation 2 to form halogen storage complexes.

$$Me^{++} + 2\ X^- + \text{quarternary ammonium halide} + \text{depolarizer} \rightleftarrows Me + \text{complex} \qquad 2.$$

: where Me is either zinc or cadmium

Generally, charging densities from about 0.25 to 0.75 amps per square inch are employed, but higher or lower densities can be used if desired. The complex thus formed intimately covers the surface of the porous halogen electrode. This complex chemically stores the halogen until the time when discharge takes place.

On discharge, reaction 2 is reversed and electric power, zinc or cadmium ions, halide ions, quarternary ammonium halides and the organic solvent depolarizer are produced.

As is well understood in the art, repeated charging and discharging or zinc-halogen or cadmium-halogen cells causes the formation of zinc or cadmium dendrites which grow from the zinc or cadmium electrode until they short the cell by extending into contact with the halide electrode. Cells formed according to the present invention, however, are longer lived than conventional cells. The longer life span of the cell of the present invention is due to the retardation of dendritic growth. It is theorized that dendrites, which enter the layer of a halogen-rich complex covering the halogen electrode, tend to be dissolved. This substantially retards the rate of dendritic growth and prolongs the life of the cells.

In actual operation, there is a tendency for hydrogen gas to be generated at the zinc or cadmium electrode. It is theorized that hydrogen gas results from the reaction of bromine-chlorine- or iodine- containing acids with zinc or cadmium. This hydrogen gas evolution presents no special problems in the present invention because the gas can rise along the surface of the zinc or cadmium electrode to the electrolyte surface. This path remains open at all times because the halogen-rich complex covering the halogen electrode does not completely fill up the region between the electrodes. It is theorized that this path remains clear because if the complex were to touch the zinc or cadmium surface, a direct reaction would take place to form water-soluble products which immediately dissolve.

Batteries and cells of the present invention are further illustrated by the aid of the following non-limiting examples. In each example, a vertical cell 10 of the type shown in crosssection in FIG. 1 was constructed. Each cell was formed of a glass casing 11 which provided supporting walls for graphite electrodes 12 and 14, and provided sealing for an electrolyte chamber 16.

Figure 1:
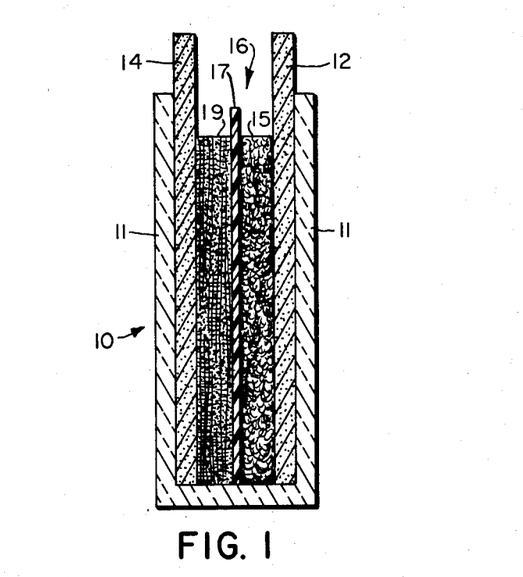
FIG. 1 is a cross-sectional view of a cell in accordance with the present invention.

The graphite electrodes 12 and 14 were separated by a layer of glass wool 15, a sheet of porous polypropylene 17 and a layer of graphite felt 19. Electrical leads (not shown) were connected to electrodes 12 and 14 by means of clips (not shown).

Electrodes 12 and 14 were made of one-eighth inch thick molded graphite and had a porosity of 26 percent. The layer of glass wool 15 and the layer of graphite felt 19 were both roughly one-eighth inches thick and at least 90 percent porous. The polypropylene separator 17 was roughly 10 mils thick and 50 percent porous.

In all examples, electrode 12 served as the zinc electrode, and electrode 14 served as the halogen electrode. Each electrode was provided with approximately ten square inches of active surface area.

Each cell was vacuum-filled with approximately one hundred cubic centimeters of electrolyte.

Each cell was charged until more than 80 percent of the zinc halide initially in solution was converted into zinc and bromine, chlorine or iodine compounds. Charging current densities ranged typically from 5 to 25 amperes/square foot.

All cells were tested at constant current drain for a variety of current densities.

EXAMPLE 1

Example 1 indicated the performance of cells filled with the following electrolytes:

| Cell Identification Letter | Electrolyte Composition |
|---|---|
| A | 0.4M $ZnBr_2$, 0.2M $ZnSO_4$ in water |
| B | 0.4M $ZnBr_2$, 0.2M $ZnSO_4$ in 9:1 by volume water to propylene carbonate |
| C | 0.4M $ZnBr_2$, 0.2M $ZnSO_4$, 0.4M $(CH_3)_4NBr$ in water |
| D | 0.4M $ZnBr_2$, 0.2M $ZnSO_4$, 0.4M $(CH_3)_4NBr$ in 9:1 by volume water to propylene carbonate |

Figure 2:
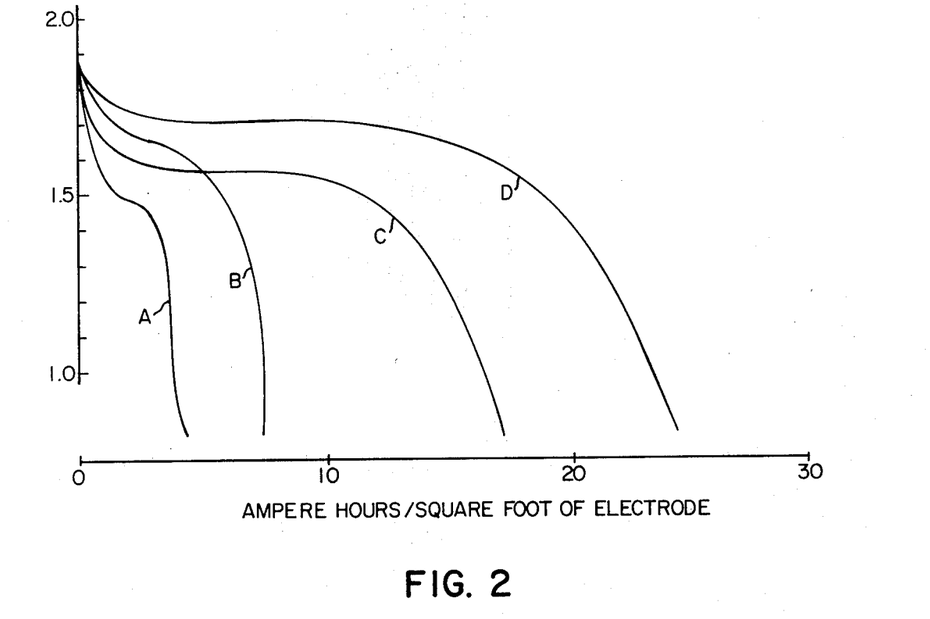
FIG. 2 is a graph showing the increase in performance when zinc bromide cells include a depolarizer in accordance with the present invention.

The performance of cells A, B, C and D is plotted in FIG. 2.

Example 1 demonstrates that the use of an electrolyte which is an aqueous solution containing zinc bromide, an organic solvent depolarizer such as propylene carbonate and a quarternary ammonium halide can produce cells whose performance is substantially superior to cells containing electrolytes which do not contain such a depolarizer.

EXAMPLE 2

A test of charge retentivity was performed by bringing cells A, B, C and D formed according to Example 1 to full charge and by measuring the length of time required for the voltage of each cell type to decay to one half of its original value while delivering no current. The results of these tests are:

| Cell Identification Letter | Charge Retentivity, hours |
|---|---|
| A | 5 – 10 |
| B | 1 – 3 |
| C | 200 – 250 |
| D | 200 – 400 |

The quarternary ammonium polyhalides are generally unstable and decompose spontaneously, particularly in contact with aqueous solutions. Comparision of the charge retentivity of cells C and D indirectly demonstrates that the quarternary ammonium polyhalides can be stabilized by dissolving them in organic liquids, such as propylene carbonate which are soluble in water, nonreactive with bromine and form a water insoluble oil in the presence of quarternary ammonium polyhalides.

EXAMPLE 3

Example 3 compares the performance of a plurality of cells formed according to example 1 and filled with 0.4M $ZnBr_2$, 0.2M $ZnSO_4$, and quarternary ammonium halide dissolved in 9:1 by volume water to propylene carbonate. The quarternary ammonium halides tested were:

| Cell Identification Letter | Quarternary Ammonium Halide |
| --- | --- |
| D | 0.4M $(CH_3)_4NBr$ |
| E | 0.4M $(CH_3)_4NCl$ |
| F | 0.4M $(CH_3)_2H_2NCl$ |
| G | 0.4M $(C_6H_5)(CH_3)_3NBr$ |
| H | 0.4M $(CH_3)_4NI$ |
| I | 0.2M $C_7H_{20}N_2Br_2$ |
| J | 0.4M $C_6H_{14}ONBr$ |

Figure 3:
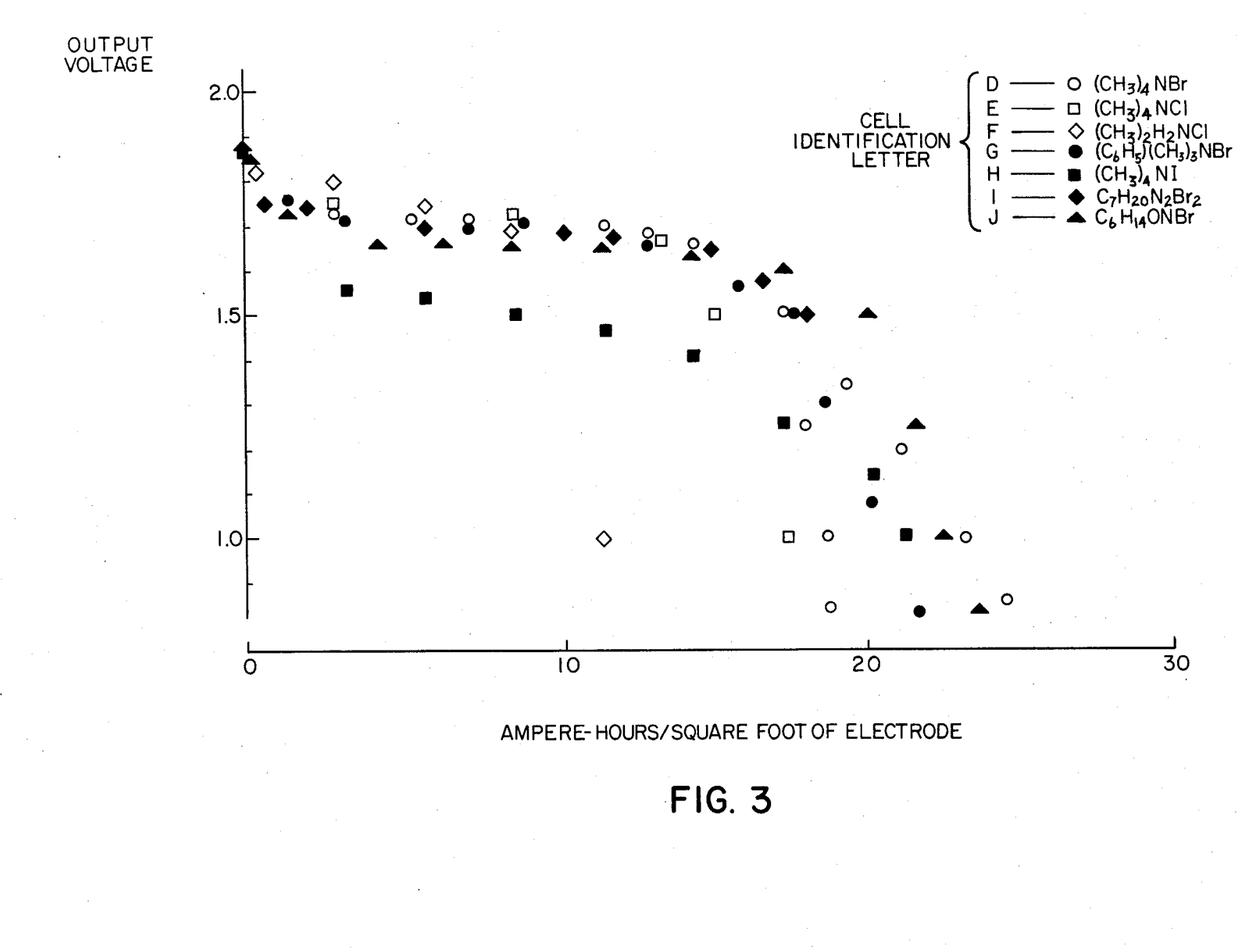
FIG. 3 is a graph showing cell performance with various water soluble quarternary ammonium halides.

Performance of said cells D, E, F, G H, I and J is plotted in FIG. 3. Example 3 illustrates that with the exception of quarternary ammonium iodides, initial level of cell performance is insensitive to the particular choice of water-soluble quarternary ammonium halide. Cell H illustrates that performance of the iodides is lower over the entire range of current density.

EXAMPLE 4

Example 4 compares the performance of a plurality of cells formed according to Example 1 and filled with 0.4M $ZnBr_2$, 0.2M $ZnSO_4$, and 0.4M $(CH_3)_4NBr$ dissolved in 9:1 by volume water to an organic complexing solvent. The organic complexing solvents tested were:

| Cell Identification Letter | Organic Liquid |
| --- | --- |
| D | Propylene carbonate |
| K | Sulfolane |
| L | Triethyl phosphate |
| M | Dimethyl sulfate |
| Z | Dimethyl carbonate |

Figure 4:
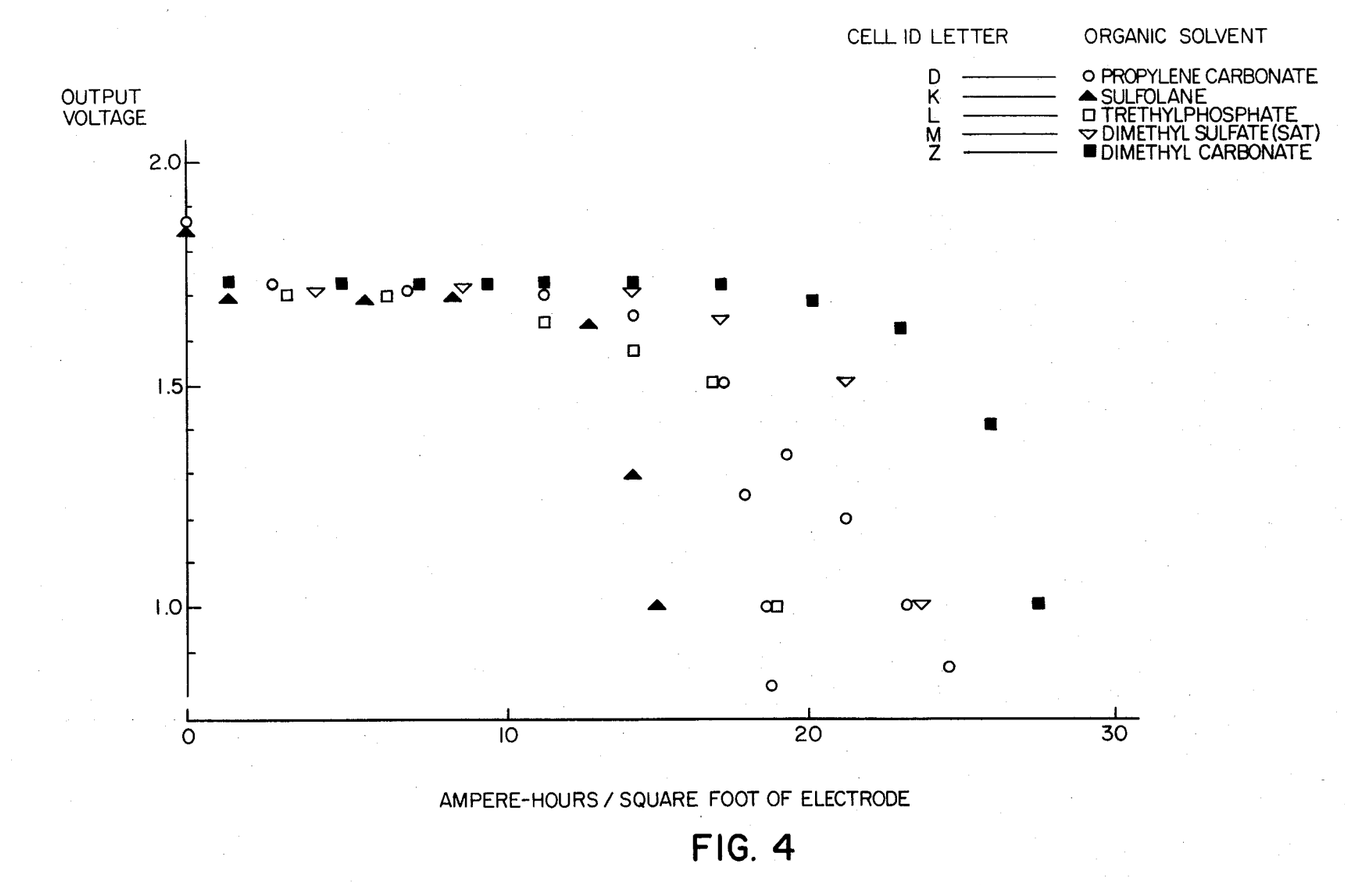
FIG. 4 is a graph showing that the initial level of cell performance is insensitive to the choice of depolarizer.

Performance of said cells D, K, L, M and Z is plotted in FIG. 4.

Example 4 illustrates that a variety of organic complexing solvents are available which are water soluble, non-reactive to bromine, and form complexes with water and quarternary ammonium polyhalides. FIG. 4 illustrates that the initial level of cell performance is insensitive to the particular choice of organic complexing solvent.

EXAMPLE 5

Example 5 compares the performance of a plurality of cells formed according to Example 1 and filled with zinc bromide, 0.2M $ZnSO_4$ and quarternary ammonium halides dissolved in 9:1 by volume water to propylene carbonate. The molarity of zinc bromide and quarternary ammonium halides was varied as follows:

| Molarity of | Cell Type D | N | O |
| --- | --- | --- | --- |
| $ZnBr_2$ | 0.4 | 1.0 | 1.50 |
| $(CH_3)_4NBr$ | 0.4 | 0.4 | 0.30 |
| $(C_2H_5)_4NBr$ | | 0.5 | |
| $C_6H_{14}ONBr$ | | 0.85 | |

Figure 5:
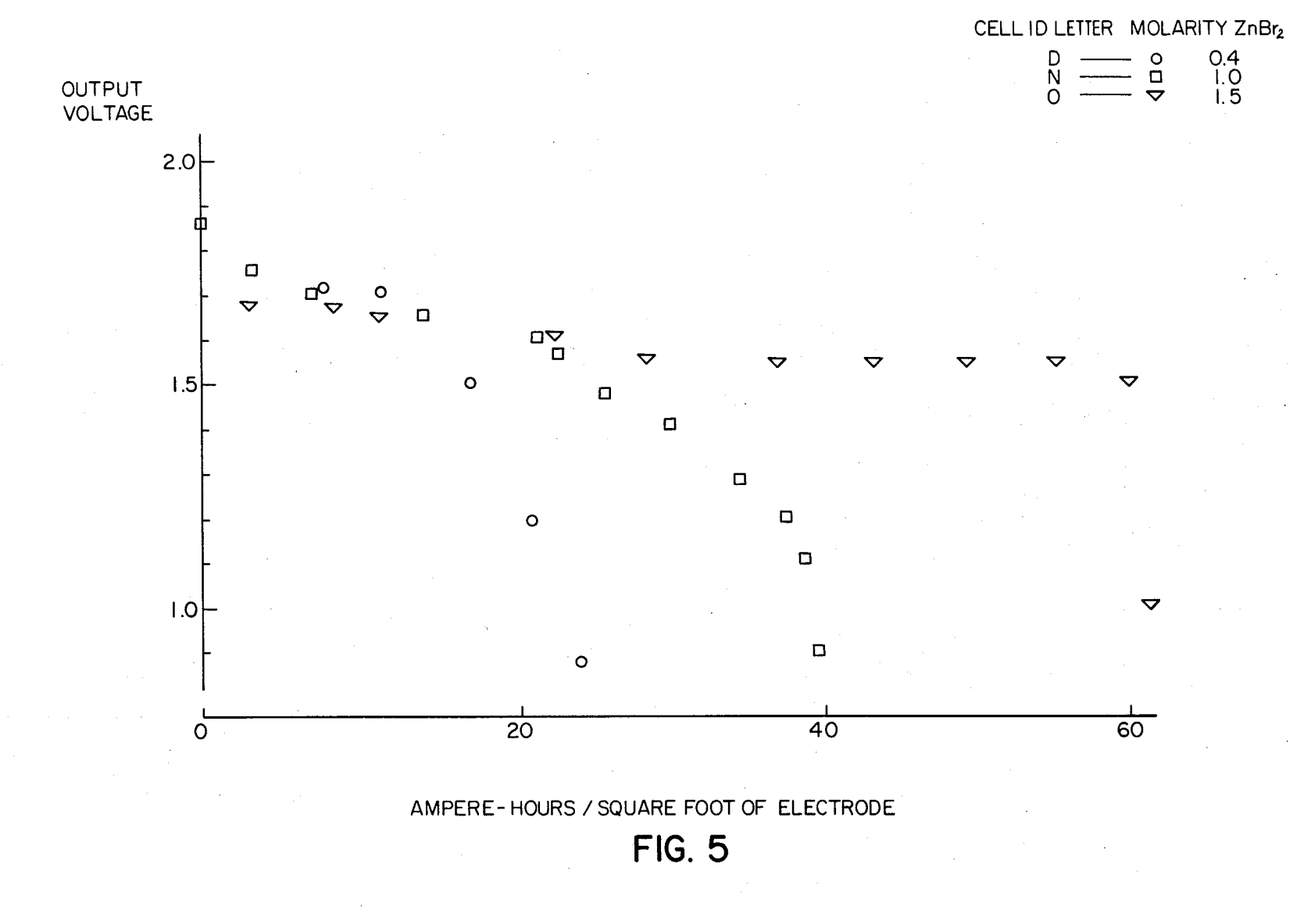
FIG. 5 is a graph showing the improved energy storage which results from increasing zinc bromide and quarternary ammonium halide concentrations.

Peformance of said cells D, N and O is plotted in FIG. 5.

Eample 5 illustrates that improved energy storage results from increasing zinc bromide and quarternary ammonium halide concentrations.

EXAMPLE 6

Example 6 compares the performance of a plurality of cells formed according to Example 1 and filled with 0.4M $ZnBr_2$, 0.2M $ZnSO_4$, 0.4M $(CH_3)_4NBr$ dissolved in the following ratios by volume of water to propylene carbonate:

| Cell Identification Letter | Volume water:Volume propylene carbonate |
| --- | --- |
| D | 90:10 |
| Q | 95:5 |
| R | 97:3 |
| S | 99:1 |
| T | 86:14 |

Figure 6:
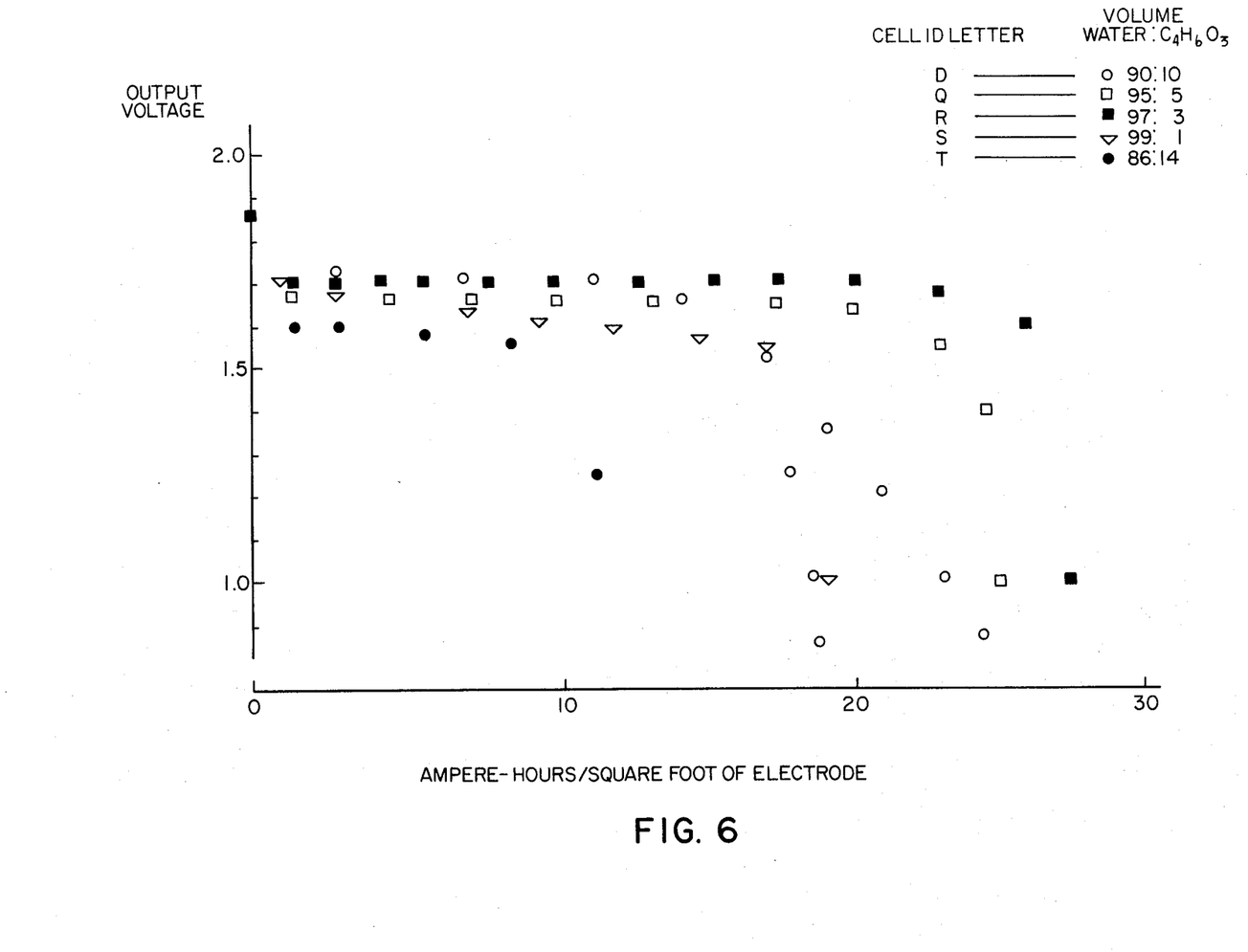
FIG. 6 is a graph showing the effect of the volume of depolarizer on the cell of the present invention.

Performance of said cells D, Q, R, S and T is plotted in FIG. 6.

Example 6 illustrates that performance depends on the volume of organic complexing solvent dissolved in the electrolyte Optimal performance for this cell configuration is achieved when propylene carbonate constitutes from 1 percent to 5 percent of the electrolyte volume.

EXAMPLE 7

Example 7 indicates the performance of cells filled with the following electrolytes:

| Cell Identification Letter | Electrolyte Composition |
| --- | --- |
| D | 0.4M $ZnBr_2$, 0.2M $ZnSO_4$, 0.4M $(CH_3)_4NBr$ in 9:1 by volume water to propylene carbonate |
| E | 0.4M $ZnBr_2$, 0.2M $ZnSO_4$, 0.4M $(CH_3)_4NCl$ in 9:1 by volume water to propylene carbonate |
| U | 0.4M $ZnCl_2$, 0.2M $ZnSO_4$, 0.4M $(CH_3)_4NBr$ in 9:1 by volume water to propylene carbonate |
| V | 0.2M $ZnCl_2$, 0.2M $ZnSO_4$, 0.4M $(CH_3)_4NCl$ in 9:1 by volume water to propylene carbonate |

Figure 7:
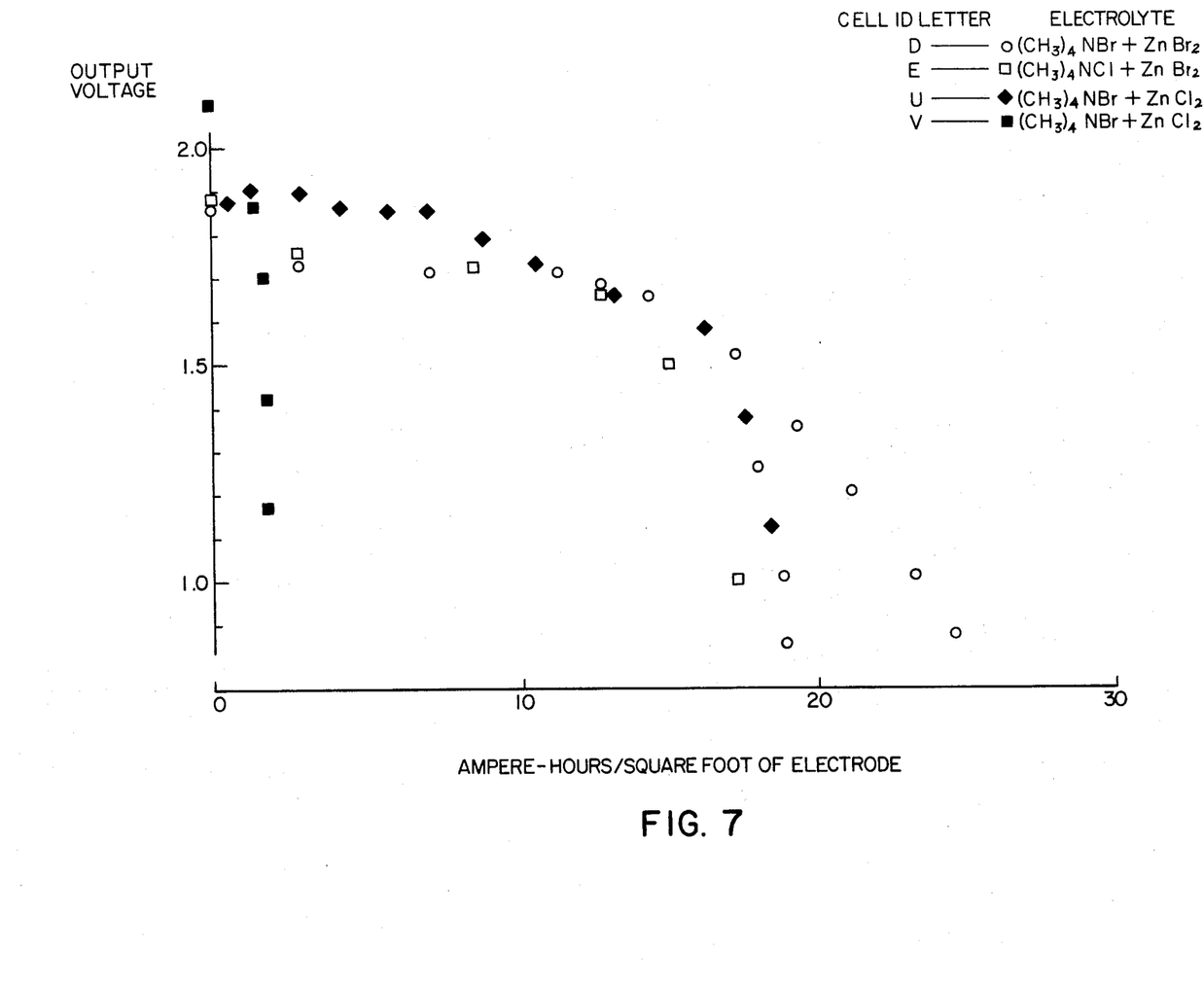
FIG. 7 is a graph showing the performance of chlorine cells constructed in accordance with the present invention.

The performance of cells D, E, U and V is plotted in FIG. 7. Curve V of FIG. 7 demonstrates that the trichloride ion is unstable in an aqueous solution and readily dissociates to chlorine and the chloride ion. Curve U, however, shows that excellent results occure with $ZnCl_2$ as an electrolyte. Comparison of curves U and V demonstrate that longer cell life for a zinc chlorine cell results if formation of the trichloride ion is avoided.

Each cell was tested for short-circuiting by alternatively charging and discharging the cells. Cells containing a depolarizer in accordance with the invention did not fail through shortcircuiting and hence the number of cycles in excess of 100 that might be necessary to produce short-circuiting cannot be determined.

It is appreciated that numerous variations of the preferred cell, electrolyte composition and battery configuration may be made. For example, the above cells ere constructed from materials readily available in the laboratory, such as glass casing 11. It is, of course, apparent that a commerical cell or battery would be formed of a material more durable than glass. Such cell construction techniques, however, are well within the skill of those in this art and will be readily apparent to those skilled in this art. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A secondary cell comprising a casing, an Me electrode where Me is a metal selected from the group consisting of zinc and cadmium, a counter electrode spaced apart from said Me electrode, an aqueous electrolyte, a quarternary ammonium halide and an organic solvent which is soluble in water, non-reactive toward the halogen or halogens in the cell and which forms a water insoluble complex in the presence of quarternary ammonium polyhalides.

2. The cell as set forth in claim 1 wherein at the counter electrode, the quarternary ammonium halide combines with halogens present in the cell to form polyhalides, and the polyhalides combine with the organic solvent to form insoluble complexes which are halogen rich.

3. The cell as set forth in claim 2 wherein the electrolyte is an aqueous salt solution containing a salt selected from the group consisting of zinc bromide, zinc chloride, zinc iodide, cadmium bromide, cadmium chloride and cadmium iodide.

4. The cell as set forth in claim 3 wherein said quarternary ammonium halides are selected from the group consistint of phenyltrimethyl ammonium bromide, N,N-dimethyl morpholinum bromide, tetramethyl ammonium chloride, tetramethyl ammonium bromide, N,N,N,N,N,N-hexamethyl diammonium methylene dibromide, dimethyl ammonium hydrochloride, tetramethyl ammonium iodide and tetraethyl ammonium bromide.

5. The cell as set forth in claim 3 wherein said Me electrode and said counter electrode are formed of porous carbon, and wherein said electrodes form sites for the electrochemically active elements reacting at the electrodes.

6. The cell as set forth in claim 5 wherein said electrolyte also includes zinc sulfate to improve electrolyte conductivity and zinc plating characteristics.

7. The cell as set forth in claim 5 wherein said organic solvent is selected from the group consisting of propylene carbonate, dimethyl carbonate, triethyl phosphate, dimethyl sulfate, sulfolane and 1,4-butane sulfone.

8. In a secondary cell including an Me electrode where Me is selected from the group consisting of zinc and cadmium, a halogen counter electrode spaced apart from said Me electrode, an aqueous electrolyte and a quarternary ammonium halide wherein the improvement comprises an organic solvent in the electrolyte which is soluble in water, non-reactive towards the halogen or halogens in the cell and which forms a water insoluble complex in the presence of quarternary ammonium polyhalides.

9. The cell as set forth in claim 8 wherein said Me electrode is a zinc electrode, said aqueous electrolyte includes zinc bromide and said quarternary ammonium halide is tetramethyl ammonium bromide.

10. The cell as set forth in claim 9 also including zinc sulfate to improve electrolyte conductivity and zinc plating characteristics.

11. The cell as set forth in claim 8 wherein said Me electrode is a zinc electrode, said aqueous electrolyte includes zinc bromide and said quarternary ammonium halide is tetramethyl ammonium chloride.

12. The cell as set forth in claim 11 also including zinc sulfate to improve electrolyte conductivity and zinc plating characteristics.

13. The cell as set forth in claim 8 wherein said Me electrode is a zinc electrode, said queous electrolyte includes zinc bromide and said quarternary ammonium halide is dimethyl ammonium chloride.

14. The cell as set forth in claim 13 also including zinc sulfate to improve electrolyte conductivity and zinc plating characteristics.

15. The cell as set forth in claim 8 wherein said Me electrode is a zinc electrode, said aqueous electrolyte includes zinc bromide and said quarternary ammonium halide is phenyltrimethyl ammonium bromide.

16. The cell as set forth in claim 15 also including zinc sulfate to improve electrolyte conductivity and zinc plating characteristics.

17. The cell as set forth in claim 8 wherein said Me electrode is a zinc electrode, said aqueous electrolyte includes zinc bromide and said quarternary ammonium halide is tetramethyl ammonium iodide.

18. The cell as set forth in claim 17 also including zinc sulfate to improve electrolyte conductivity and zinc plating characteristics.

19. The cell as set forth in claim 8 wherein said Me electrode is a zinc electrode, said aqueous electrolyte includes zinc bromide and said quarternary ammonium halide is $C_7H_{20}N_2Nr_2Br_2$.

20. The cell as set forth in claim 19 also including zinc sulfate to improve electrolyte conductivity and zinc plating characteristics.

21. The cell as set forth in claim 8 wherein said Me electrode is a zinc electrode, said aqueous electrolyte includes zinc bromide and said quarternary ammonium halide is $C_6H_{14}ONBr$.

22. The cell as set forth in claim 21 also including zinc sulfate to improve electrolyte conductivity and zinc plating characteristics.

23. The cell as set forth in claim 8 wherein said Me electrode is a zinc electrode, said aqueous electrolyte includes zinc bromide and said quarternary ammonium halide is tetraethyl ammonium bromide.

24. The cell as set forth in claim 23 also including zinc sulfate to improve electrolyte conductivity and zinc plating characteristics.

* * * * *